(12) United States Patent
Arnold et al.

(10) Patent No.: US 6,269,642 B1
(45) Date of Patent: Aug. 7, 2001

(54) VARIABLE GEOMETRY TURBOCHARGER

(75) Inventors: Steven Don Arnold, Rancho Palos Verdes; Steven P. Martin, West Covina; Kevin Slupski, Redondo Beach; Voytek Kanigowski, Fountain Valley, all of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/408,694

(22) Filed: Sep. 30, 1999

Related U.S. Application Data

(60) Provisional application No. 60/103,063, filed on Oct. 5, 1998.

(51) Int. Cl.[7] .................................................. F02D 23/00
(52) U.S. Cl. .......................... 60/602; 415/163; 415/164; 92/33; 92/136
(58) Field of Search ..................... 415/164, 163, 415/160; 92/33, 136; 60/602

(56) References Cited

U.S. PATENT DOCUMENTS

| | | | |
|---|---|---|---|
| 3,645,645 | * 2/1972 | Gammill et al. | 415/163 |
| 4,274,329 | * 6/1981 | Weyer | 92/33 |
| 4,304,171 | * 12/1981 | Lang et al. | 92/136 |
| 4,403,913 | * 9/1983 | Fisker | 415/164 |
| 4,502,836 | 3/1985 | Swearingen . | |
| 4,654,941 | * 4/1987 | Burdette et al. | 415/164 |
| 4,679,984 | 7/1987 | Swihart et al. . | |
| 4,683,805 | * 8/1987 | Fejes | 92/136 |
| 4,726,744 | * 2/1988 | Arnold | 415/164 |
| 4,804,316 | 2/1989 | Fluery . | |
| 5,653,419 | * 8/1997 | Uchisawa et al. | 92/136 |

FOREIGN PATENT DOCUMENTS

| | | |
|---|---|---|
| 731822 A | 6/1955 | (GB) . |
| 358122305A | * 7/1983 | (JP) ..................................... 415/164 |

* cited by examiner

Primary Examiner—Thomas Denion
Assistant Examiner—Thai-Ba Trieu
(74) Attorney, Agent, or Firm—Felix L. Fischer

(57) ABSTRACT

A variable geometry turbocharger employs multiple vanes in the turbine inlet with a unison ring and integral cast wall in the turbine housing forming the nozzle walls. The unison ring incorporates actuation slots receiving tabs on the vanes for opening the closing the nozzle area upon rotation of the unison ring. An integral electrohydraulic actuator rotates the unison ring through a rack and pinion driven crank shaft with direct position feedback to the spring biased variable current solenoid via a cam on the crank shaft.

7 Claims, 15 Drawing Sheets

1. NO CURRENT

3. BALANCED STATE LOW CURRENT

VARIABLE GEOMETRY TURBOCHARGER

CROSS REFERENCE TO RELATED APPLICATIONS

This application claims the priority of application Ser. No. 60/103.063 filed on Oct. 05, 1998 having the same title as the present application.

BACKGROUND OF THE INVENTION

1. Field of the Invention

This invention relates generally to the field of turbochargers having variable turbine inlet geometries. More particularly, the present invention provides a simplified structural arrangement for positioning multiple aerodynamic vanes in the inlet nozzle of the turbine housing and an integrated actuator for control of the vane position.

2. Description of the Related Art

In a turbocharger it is often desirable to control the flow of exhaust gas into the turbine to improve the efficiency or operational range. Various configurations of variable nozzles have been employed to control the exhaust gas flow. Multiple pivoting vanes annularly positioned around the turbine inlet and commonly controlled to alter the throat area of the passages between the vanes is an approach which has been successfully used in prior turbochargers. Various approaches to this method for implementing a variable nozzle are disclosed in U.S. Pat. No. 4,679,984 to Swihart et al. entitled "Actuation System for Variable Nozzle Turbine" and U.S. Pat. No. 4,804,316 to Fleury entitled "Suspension for the Pivoting Vane Actuation Mechanism of a Variable Nozzle Turbocharger" having a common assignee with the present application.

While multiple vane variable nozzle turbochargers have significantly increased the overall efficiency and capability of turbochargers, the complexity of support and actuation structures for the vanes have increased manufacturing costs and occasionally created maintenance issues. It is therefore desirable to reduce the complexity and parts count of variable nozzle structural arrangements and improve the actuation systems to increase reliability and reduce manufacturing cost for turbochargers employing them.

SUMMARY OF THE INVENTION

A variable geometry turbocharger employing the present invention includes a turbine housing having a standard inlet for exhaust gas and an outlet to the exhaust system of the engine. A volute is connected to the inlet and an integral outer nozzle wall is incorporated in the turbine housing casting adjacent the volute. A center housing is attached to the turbine housing. A center bore in the center housing carries a bearing assembly. A compressor housing having an air inlet and a compressed air outlet is attached to the center housing.

A turbine wheel is carried within the turbine housing and attached to a shaft extending through the center housing, supported by the bearing assembly. The shaft attached to a compressor impeller carried within the compressor housing.

A plurality of vanes having rotation posts extending from a first surface substantially parallel to the outer nozzle wall provide the variable nozzle. The posts are received in circumferentially spaced apertures in the outer nozzle wall. The vanes further have actuation tabs extending from the opposite surface of the vanes. A unison ring is engaged between the center housing and the vanes and has a plurality of profiled slots equal in number to the vanes. The slots are oriented obliquely to a circumference of the unison ring and receive the tabs. The profiled surfaces of the slots engage the substantially flat sides of the tabs on different surfaces during the translation to provide optimum control and wear reduction.

Actuation of the unison ring is accomplished by a radial slot and a crank shaft having a pin engaging the radial slot. The crank shaft is movable continuously from a first position to a second position, causing the pin to translate in the radial slot and impart force perpendicular to the radial slot to urge rotational motion of the unison ring. The rotational motion of the unison ring causes the tabs to traverse the actuation slots from a first end of the slots to a second end of the slots. The oblique orientation of the slots causes a continuously variable rotation of the vanes from a first open position to a second closed position.

An integral hydraulic actuator provides the actuation mechanism for the crank shaft. Mounted in a boss in the center housing, the actuator uses a piston and piston rod attached by a rack and pinion to the crank shaft for position control of the vanes. Hydraulic pressure to operate the piston is provided by a solenoid operated multiport valve with direct feedback through a cam mounted on the crank shaft adjacent the pinion gear.

BRIEF DESCRIPTION OF THE DRAWINGS

The details and features of the present invention will be more clearly understood with respect to the detailed description and drawings in which.

DETAILED DESCRIPTION OF THE INVENTION

Figure 1:
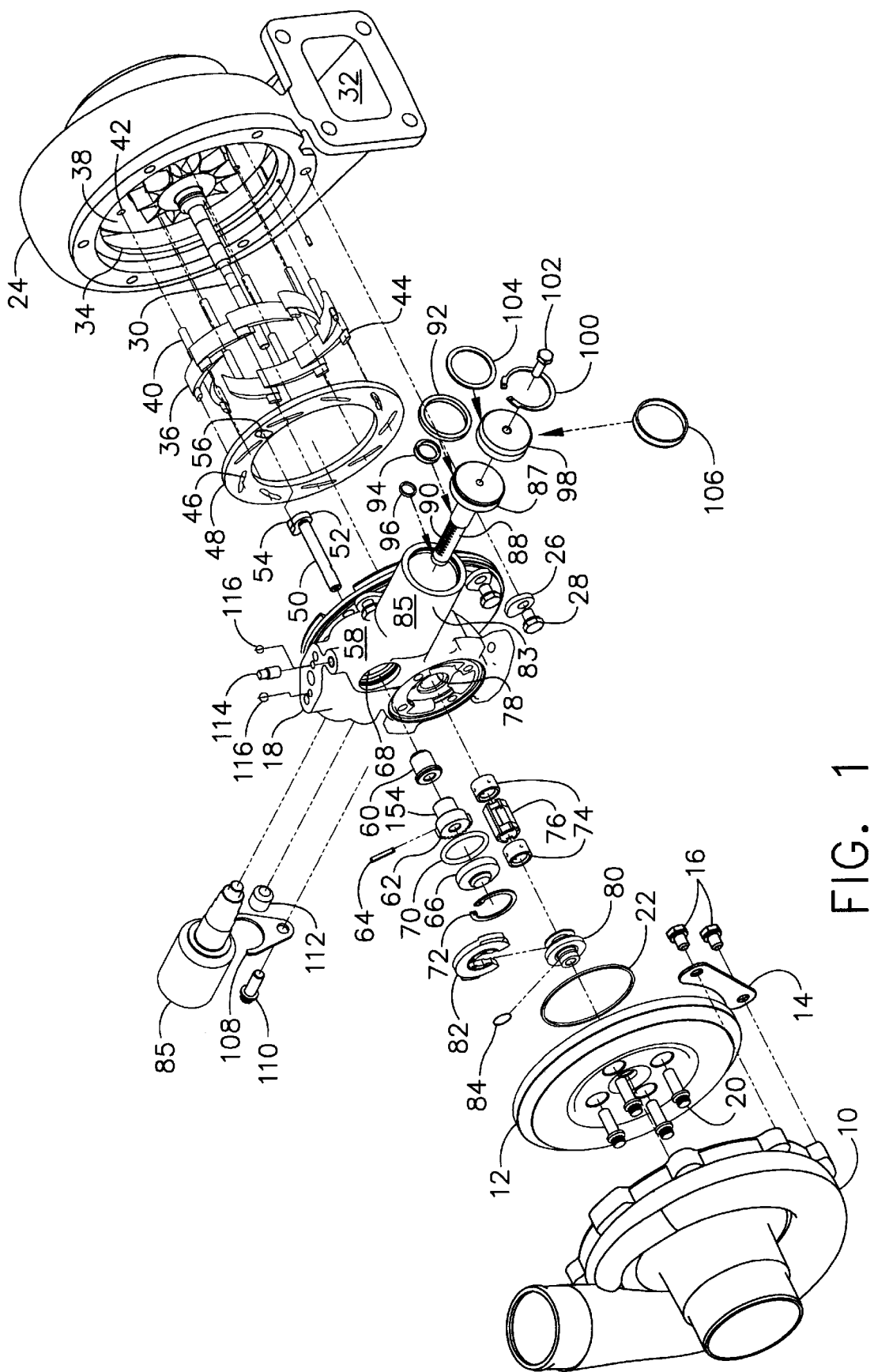
FIG. 1 is an exploded view of an embodiment of a turbocharger employing the present invention.

Referring to the drawings, the embodiment of the invention shown in FIG. 1 includes a compressor housing 10 which is connected to a backplate 12 using two or more clamps 14 secured by bolts 16. The backplate is attached to a center housing 18 with multiple bolts 20 and a seal ring 22. A turbine housing 24 is connected to the center housing using multiple clamps 26 secured by bolts 28. A turbine wheel and shaft assembly 30 is carried within the turbine housing. Exhaust gas or other high energy gas supplying the turbocharger enters the turbine housing through inlet 32 and is distributed through the volume in the turbine housing for substantially radial entry into the turbine wheel through a circumferential nozzle entry 34.

Multiple vanes 36 are mounted to a nozzle wall 38 machined into the turbine housing using posts 40 extending from the vanes for rotational engagement within holes 42 in the nozzle wall. Actuation tabs 44 extend from the vanes to be engaged by slots 46 in unison ring 48 which acts as the second nozzle wall. The configuration of the tabs, slots and unison ring will be explained in greater detail subsequently. An actuator crank 50 terminates at a first end in a lever arm 52 carrying a pin 54 to engage elliptical slot 56 in the unison ring for rotation of the ring as will be later explained. The crank extends into a boss 58 in the center housing casting through a bushing 60 and a gear 62 which is secured to the crank by a pin 64 and is received into an end bearing 66 which mates with aperture 68 in the crank boss. An O-ring 70 seals the end bearing and a snap ring 72 secures the end bearing into the aperture 68.

Figure 2:
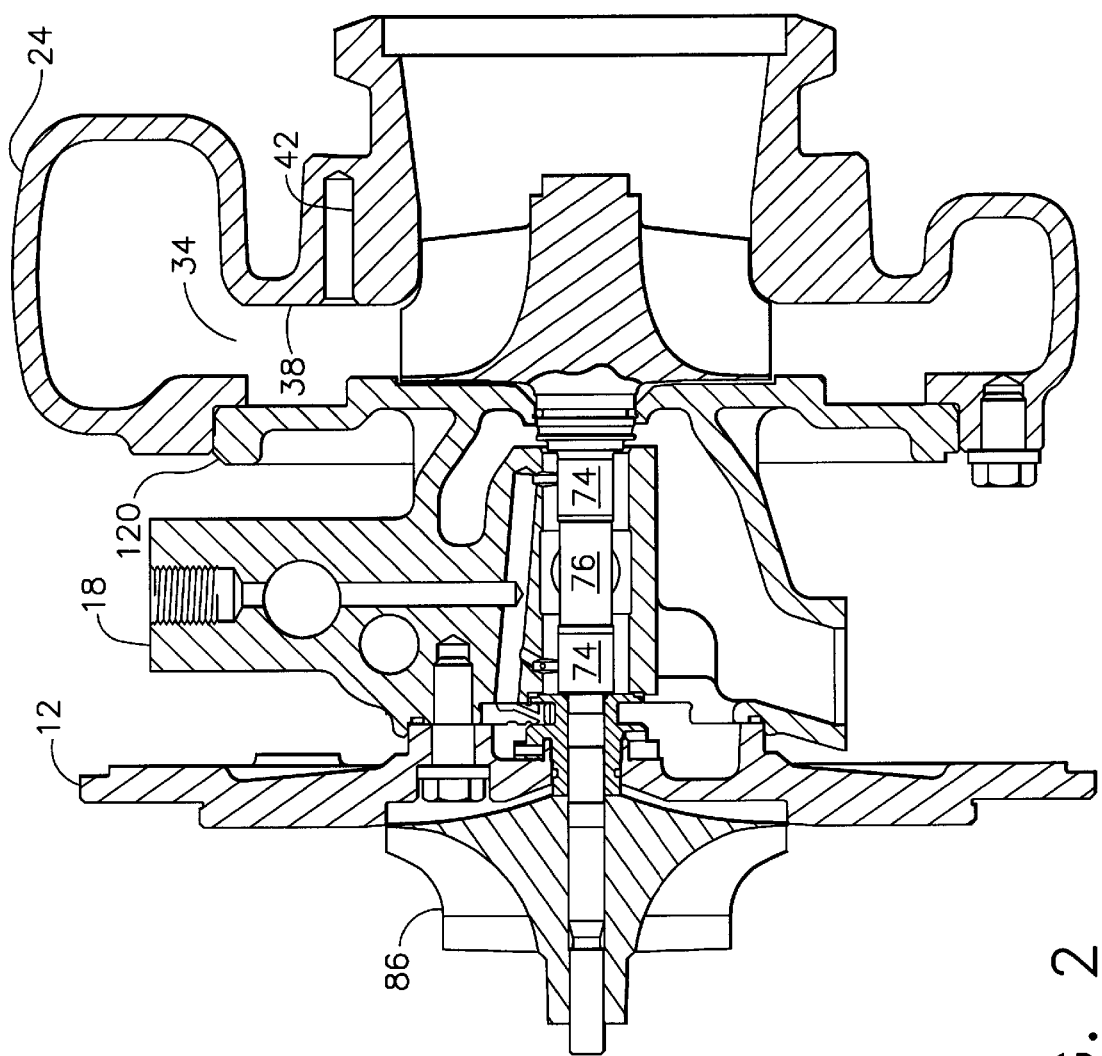
FIG. 2 is a side section elevation showing the turbine housing, center housing and compressor back plate with the turbine shaft wheel assembly and compressor impeller as supported by the bearing system.

A bearing system having two journal bearings 74 and a bearing spacer 76 support the shaft wheel assembly in the center housing center bore 78. The shaft further extends through a thrust collar 80 which engages a thrust bearing 82 carried between the center housing and compressor back plate. A piston ring 84 seals the thrust collar with the shaft bore in the back plate. The stack up of the shaft wheel assembly within the turbine housing, center housing and back plate is best seen in FIG. 2. The unison ring and vanes are not shown for clarity. The compressor impeller 86 is attached to the shaft wheel assembly.

Referring again to FIG. 1, the integrated actuator for the turbocharger is housed in an actuator boss 83 in the casting of the center housing 18. A solenoid valve 85 is mounted in an aperture at one end of the boss while the actuating components are mounted in a second aperture at the opposite end of the boss. The actuating components include a piston 87 that incorporates a rod 88 having a rack gear 90 engaging the gear 62 mounted on the crank shaft 50. A ring seal 92 surrounds the piston circumference sealing the piston in the bore of the actuator boss. Additional ring seals 94 and 96 seal the piston rod to a rod bore of smaller diameter than the piston bore. The piston bore is sealed with a piston end 98 held in the bore with a snap ring 100. A bolt 102 is inserted into a threaded hole in the piston end for use in manipulating the piston end. An additional ring seal 104 seals the piston end to the bore. Alternatively, a freeze plug 106 is employed as a replacement for the piston end. The solenoid valve is secured to the boss with a bracket 108 held by a bolt 110. Bore plugs 112 and 114 seal the blind ends of actuation passages in the actuator boss while steel balls 116 are employed to seal other actuation passages, described in greater detail subsequently.

FIG. 2 is a side sectional elevation of the turbocharger showing the assembled turbine housing, center housing and compressor back plate with the turbine shaft wheel assembly and compressor impeller supported by the bearing assembly.

Figure 3:
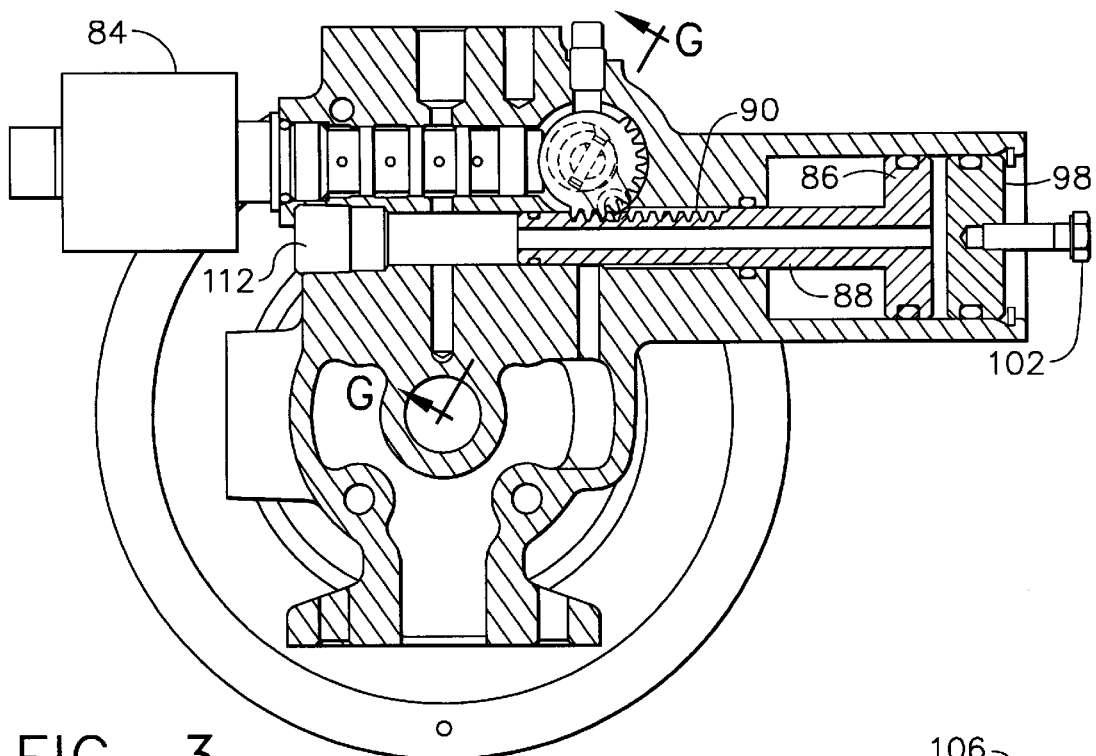
FIG. 3 is an end section elevation through the center housing showing an embodiment of an integral actuation valve arrangement according to the invention.
Figure 4:
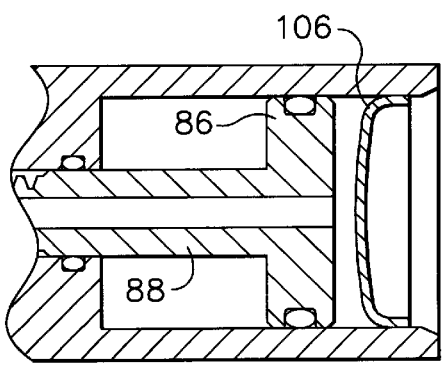
FIG. 4 is a partial view of an alternate embodiment of the valve piston arrangement.

FIG. 3 is an end sectional view through the actuator boss and assembled actuator components. FIG. 4 shows the alternative freeze plug arrangement for sealing the piston bore.

Figure 5A:
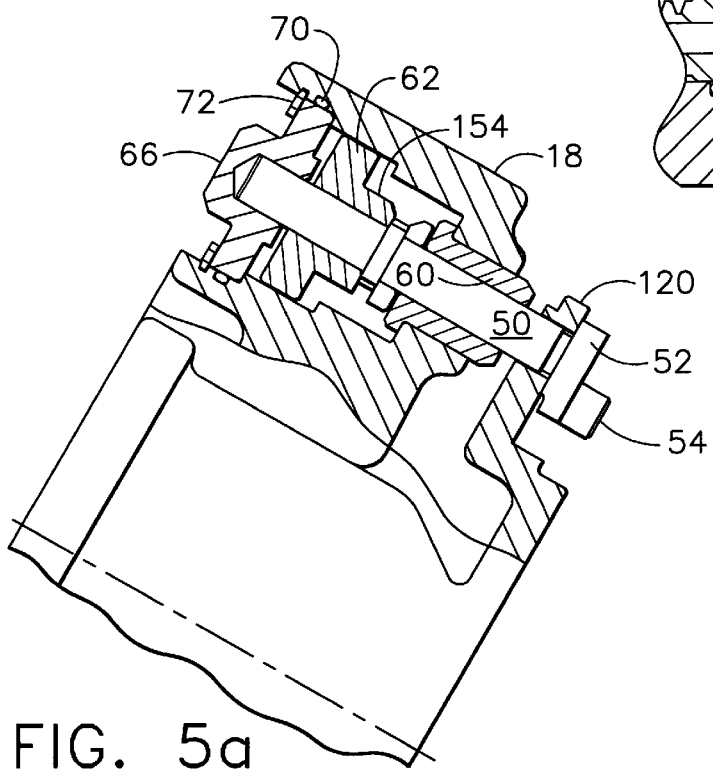
FIG. 5a is a view along line G—G of FIG. 3 and with FIGS. 5b–c provides section views of the crank shaft assembly extending from the actuation valve to the unison ring engaging the nozzle vanes.
Figure 5B:
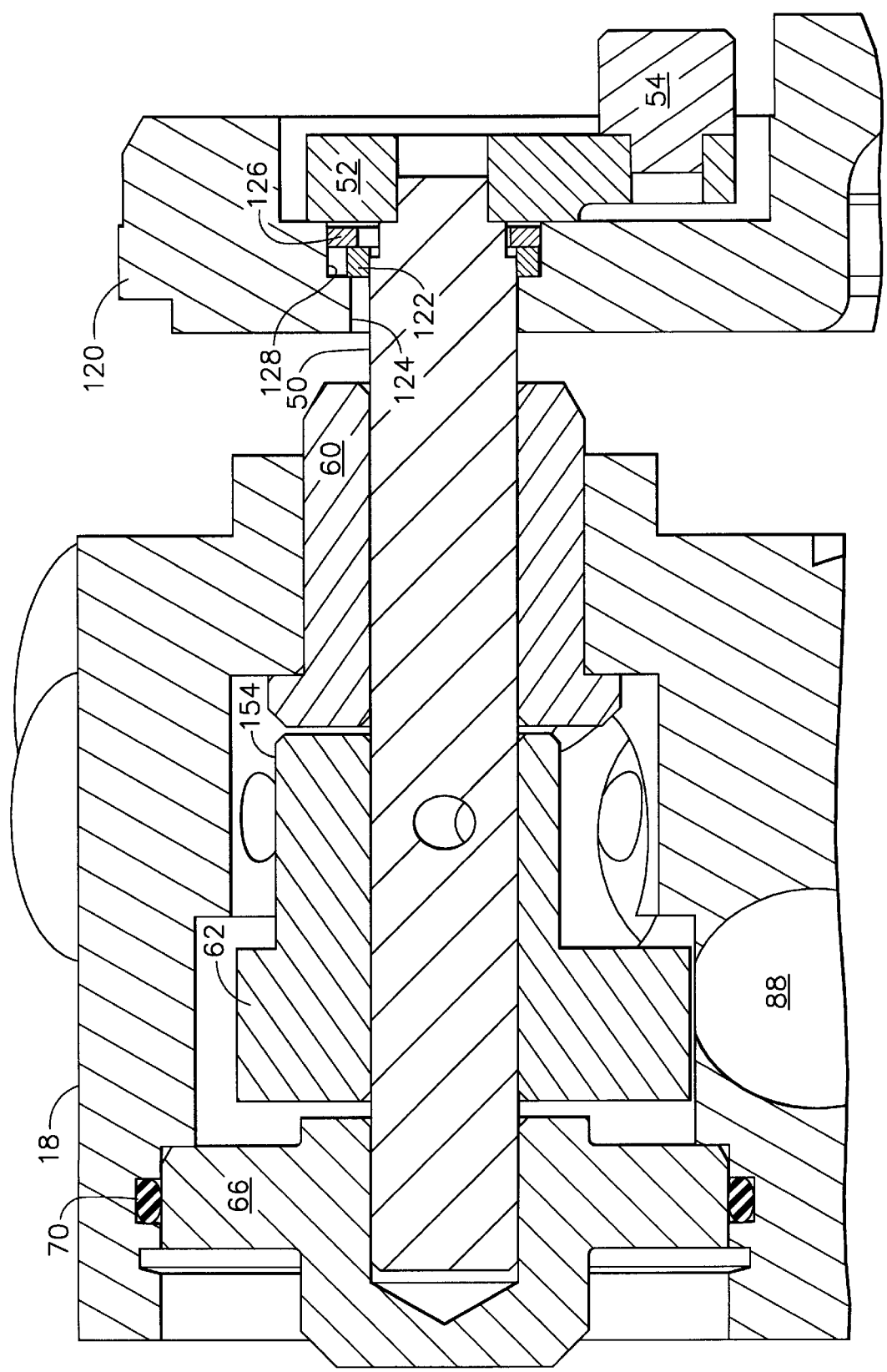
Figure 5C:
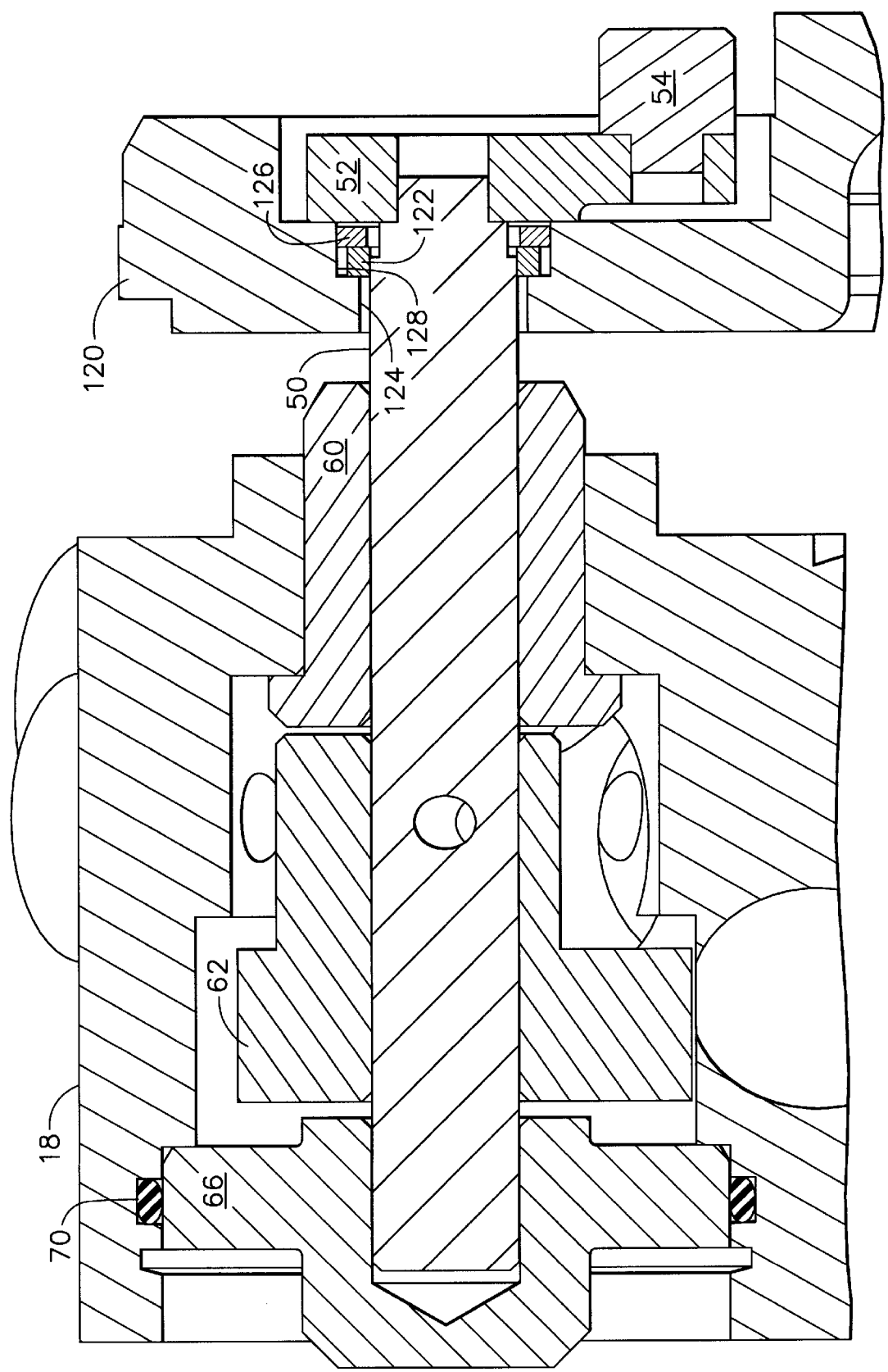

As best seen in FIG. 2, the center housing includes a main casting portion and a turbine housing back plate 120 for attachment of the center housing to the turbine housing using bolts, as previously described. FIG. 5a is a sectional view showing the crank shaft assembly with the gear 62 bushing 60 mounted in the main casting portion of the center housing with the crank shaft extending across the air gap between the main casting portion and the turbine housing back plate and into an aperture in the back plate. FIG. 5b shows the details of the crank shaft sealing arrangement in the back plate aperture. A first metallic ring seal 122 having a first diameter is employed to seal an inner diameter of the aperture 124, while a second metallic ring seal 126 is employed in combination with the first seal to seal a second larger diameter 128 of the aperture. This arrangement allows continued sealing during uneven thermal expansion of the main casting portion and the back plate during operation. FIG. 5b demonstrates the configuration during operation, with the temperature of the back plate exceed the main portion, with resulting greater expansion while FIG. 5c, shows the arrangement with nominal tolerance at a common temperature for the main casting portion and the back plate.

Figure 6B:
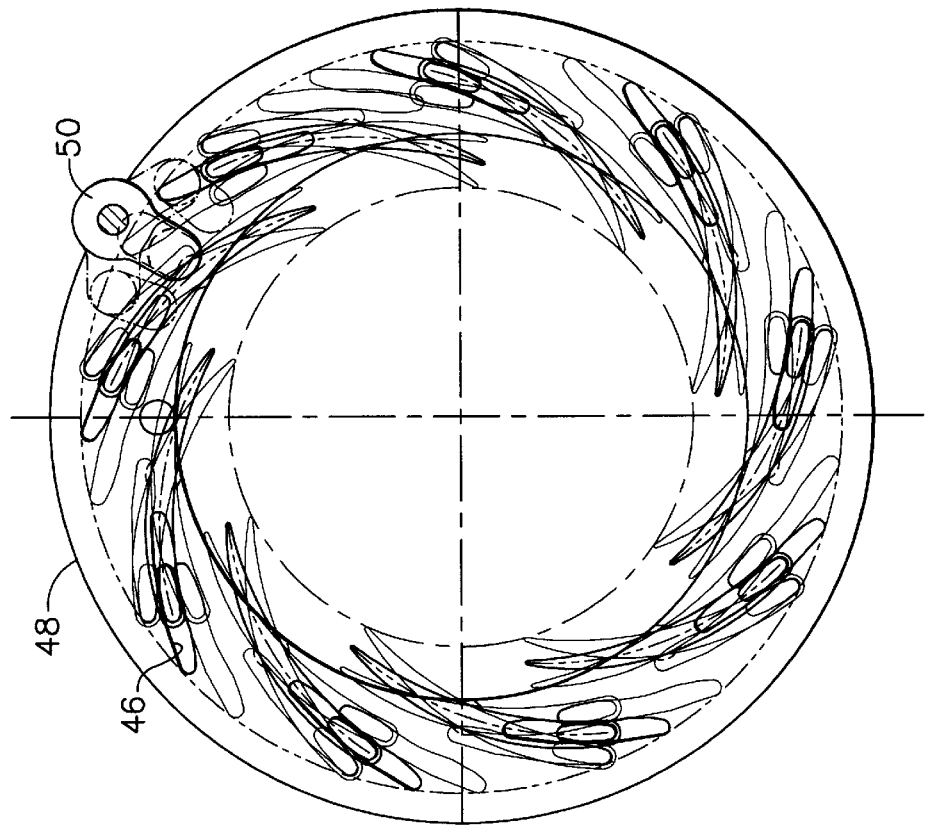
FIGS. 6a–e are end views of the unison ring and nozzle vanes demonstrating the variable vane positions and the actuation structural arrangement.
Figure 6A:
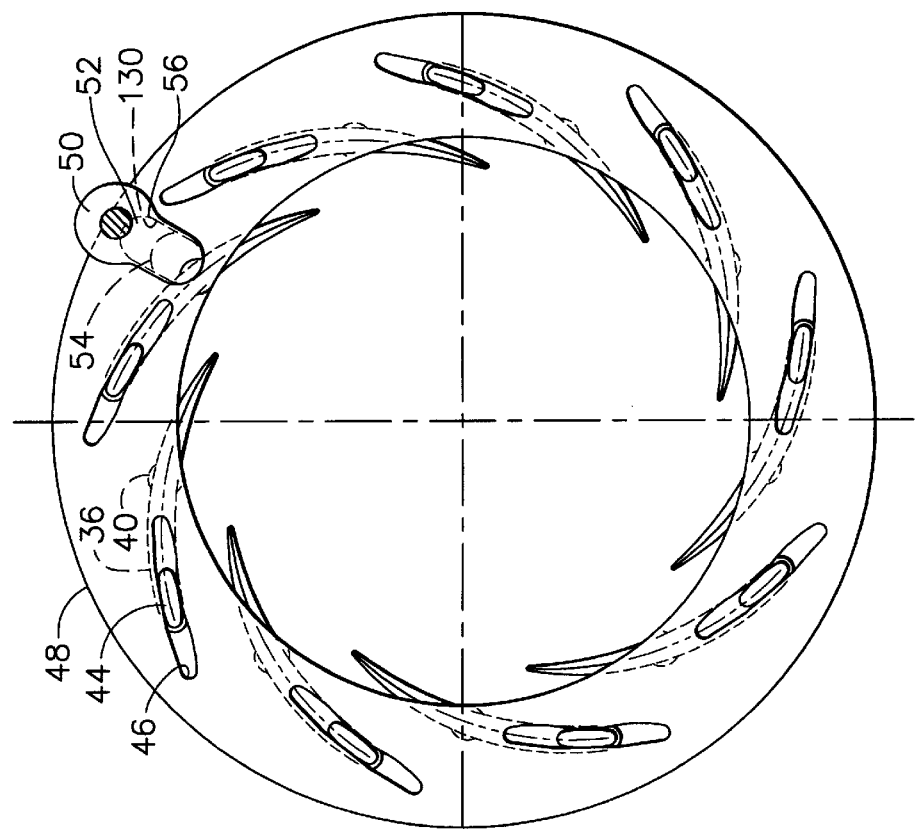
Figure 6C:
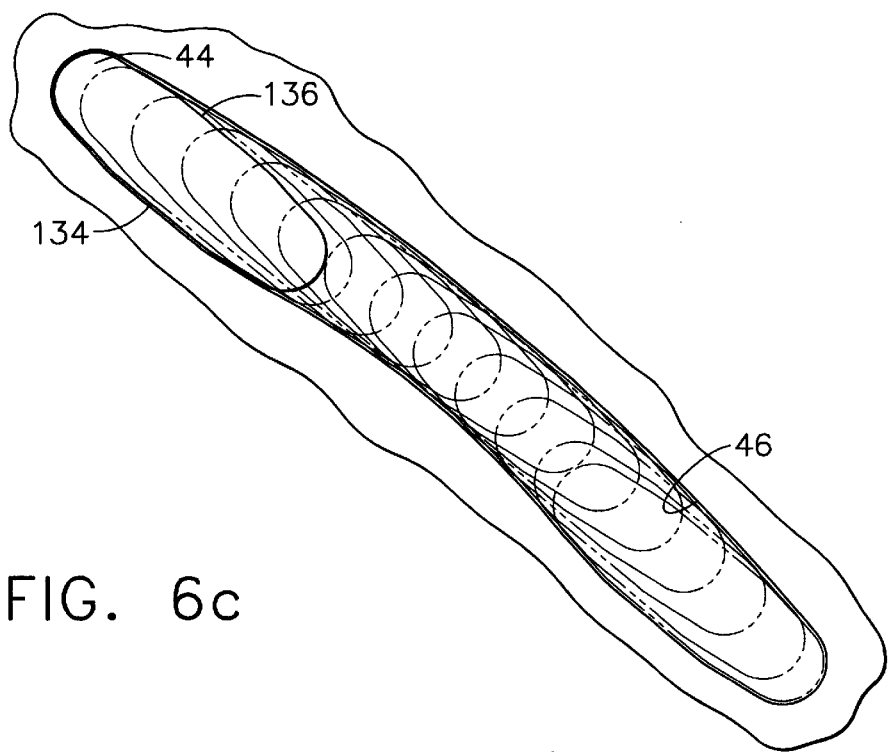

The nozzle vanes 36 in the turbine inlet nozzle are operated by the unison ring 48. FIG. 6a shows the unison ring engaged by the end pin 54 of the crank shaft 50 in a radial slot 130. Rotation of the crank shaft causes the offset end pin to traverse the radial slot resulting in rotation of the unison ring. The vanes, mounted for rotation on pins 40 which extend into receiving holes 42 in the nozzle wall of the turbine housing, have actuation tabs 44 which are received in the slots 46 in the unison ring. As the unison ring rotates. The motion of the slots causes the tabs to traverse from one end of the slot to the other resulting in rotation of the vanes from a first fully open position, through a neutral position, shown in FIG. 6a, to a fully closed position. FIG. 6b shows in phantom the fully open, neutral and fully closed positions of the vanes with tab positioning in the slots. FIG. 6c is an enlarged view of the unison ring slot with the tab shown in multiple positions. The tab incorporates substantially flat sides 134 and 136 which provide extended engagement of the slot wall by the tab to reduce point wear on the tab. The profile of the slot, not purely oval, is predetermined to provide maximum engagement with the tab, while engaging first side 134 of the tab at the open and closed end points with maximum area and the second side 136 during the intermediate positioning of the vanes.

Figure 6D:
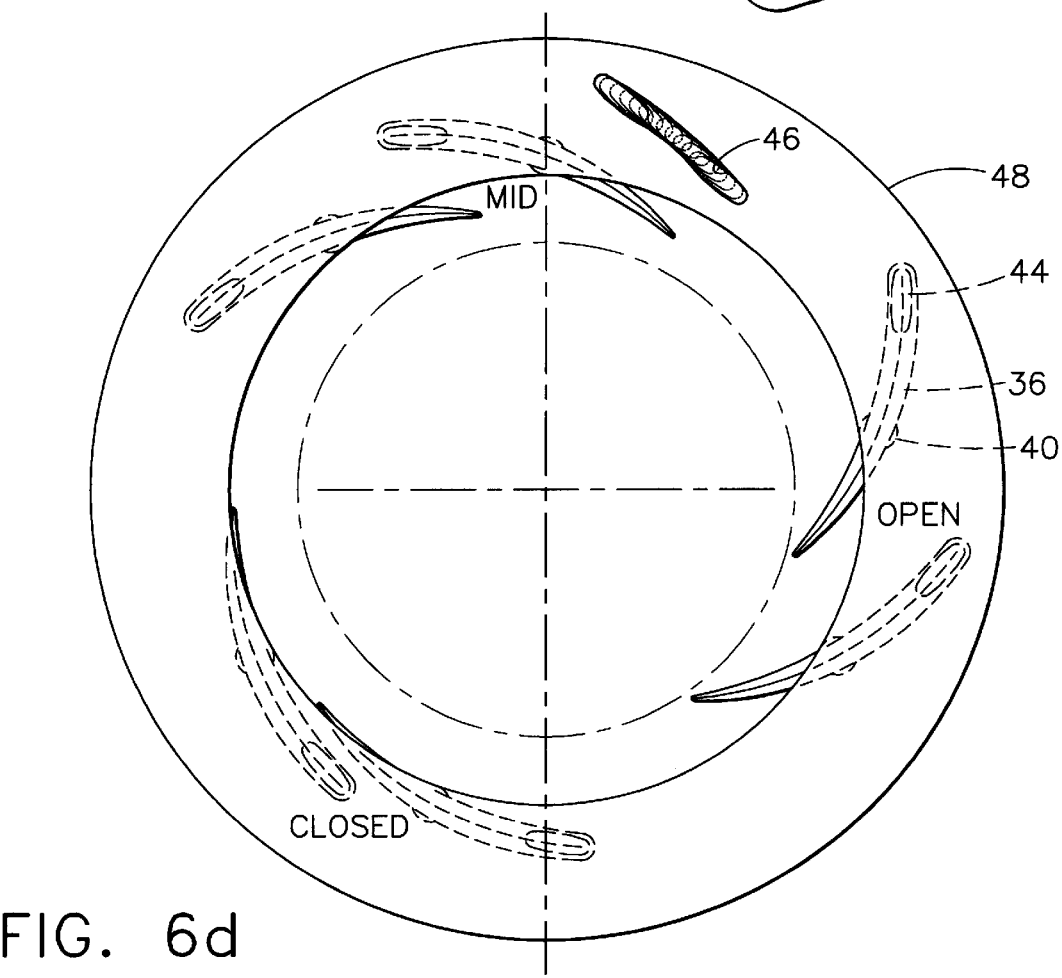
Figure 6E:
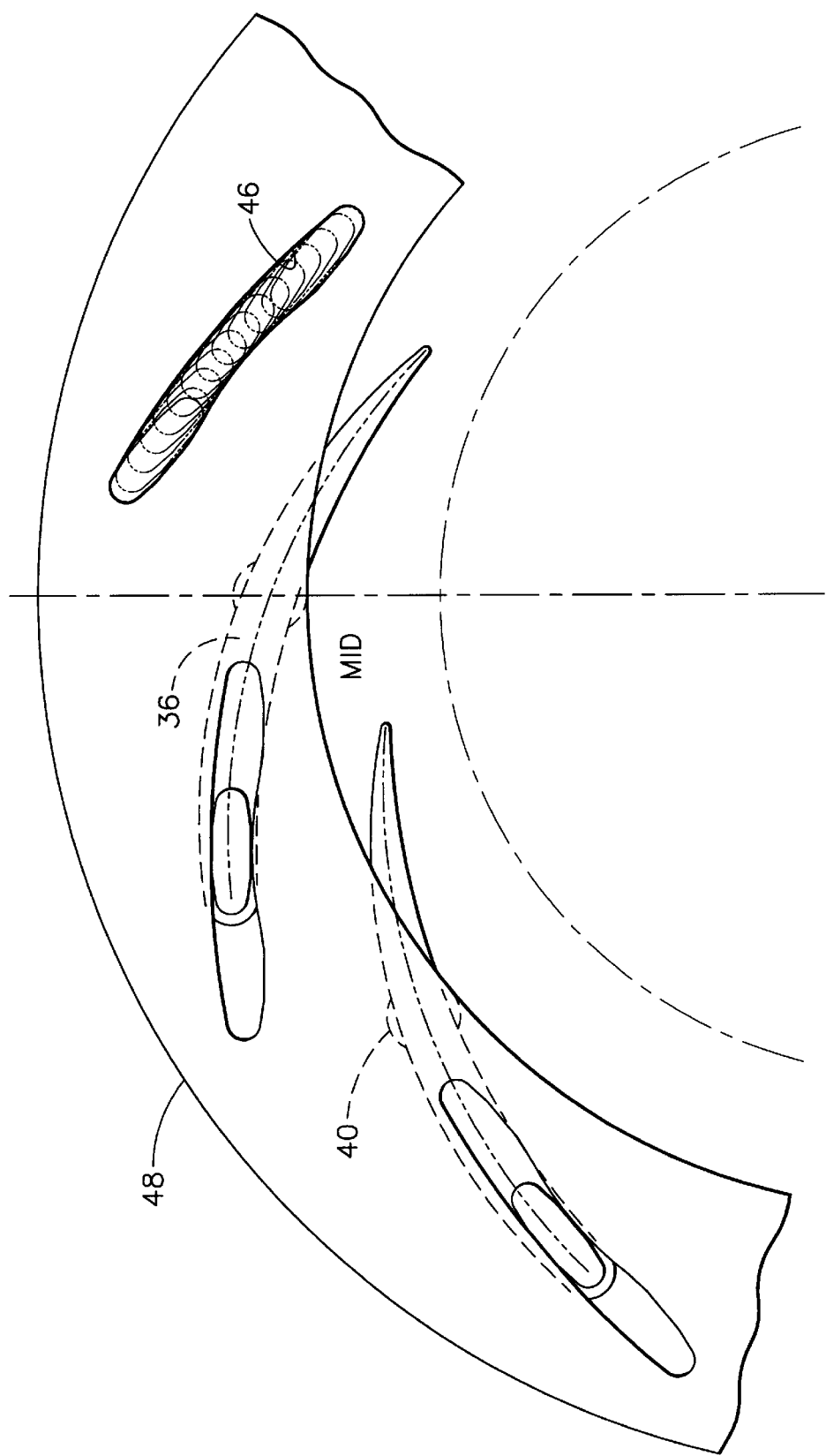

For the embodiment shown in the drawings, FIG. 6d shows the fully open and fully closed positions of the vanes. A 22 degree rotation of the vanes is provided. Table 1 shows the related leading edge, trailing edge and throat size in mm for the open, mid and closed positions of the vanes.

Figure 7:
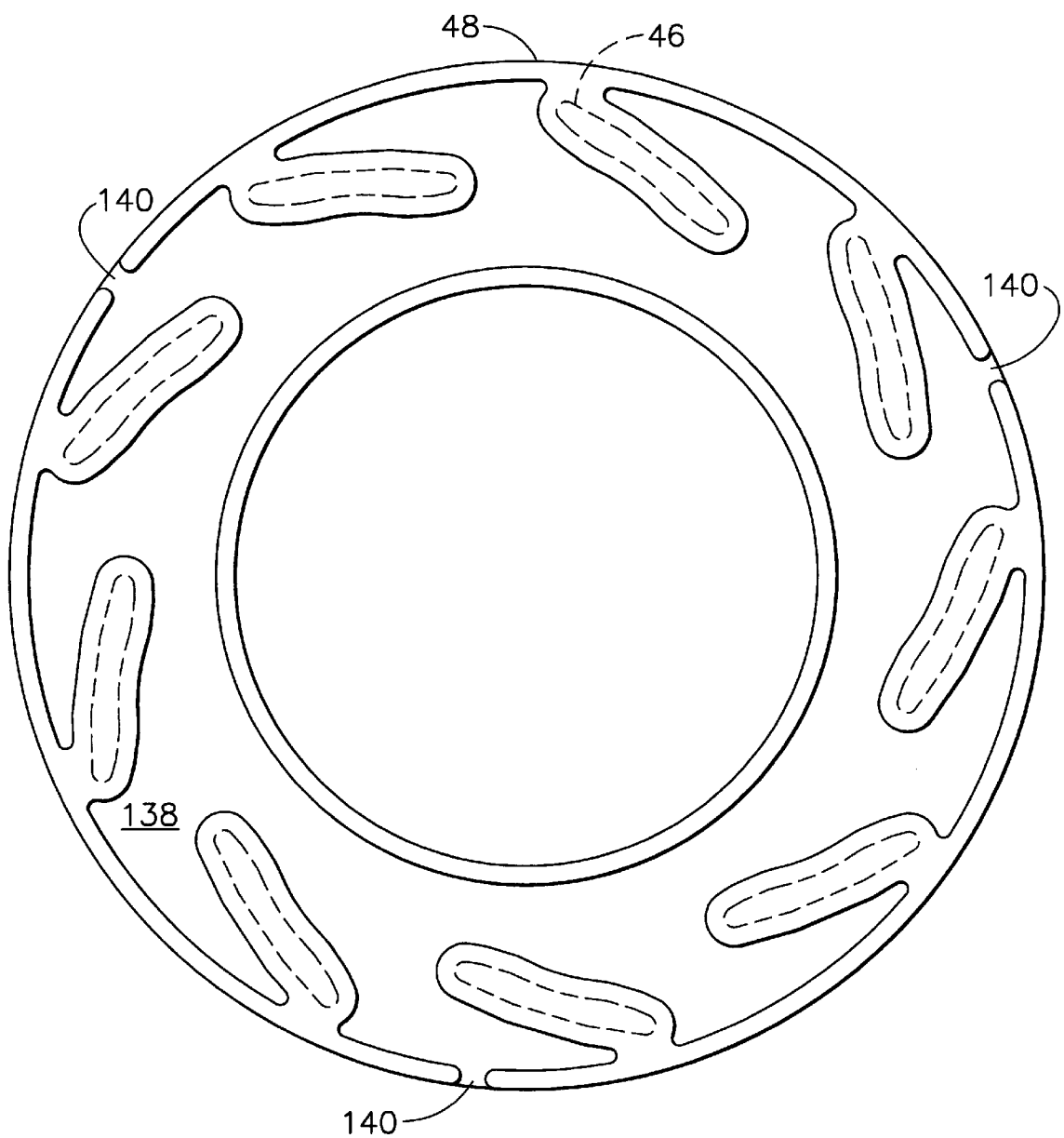
FIG. 7 is a reverse end view of an alternative embodiment of the unison ring showing a blind relief design for pressure compensation.
Figure 8:
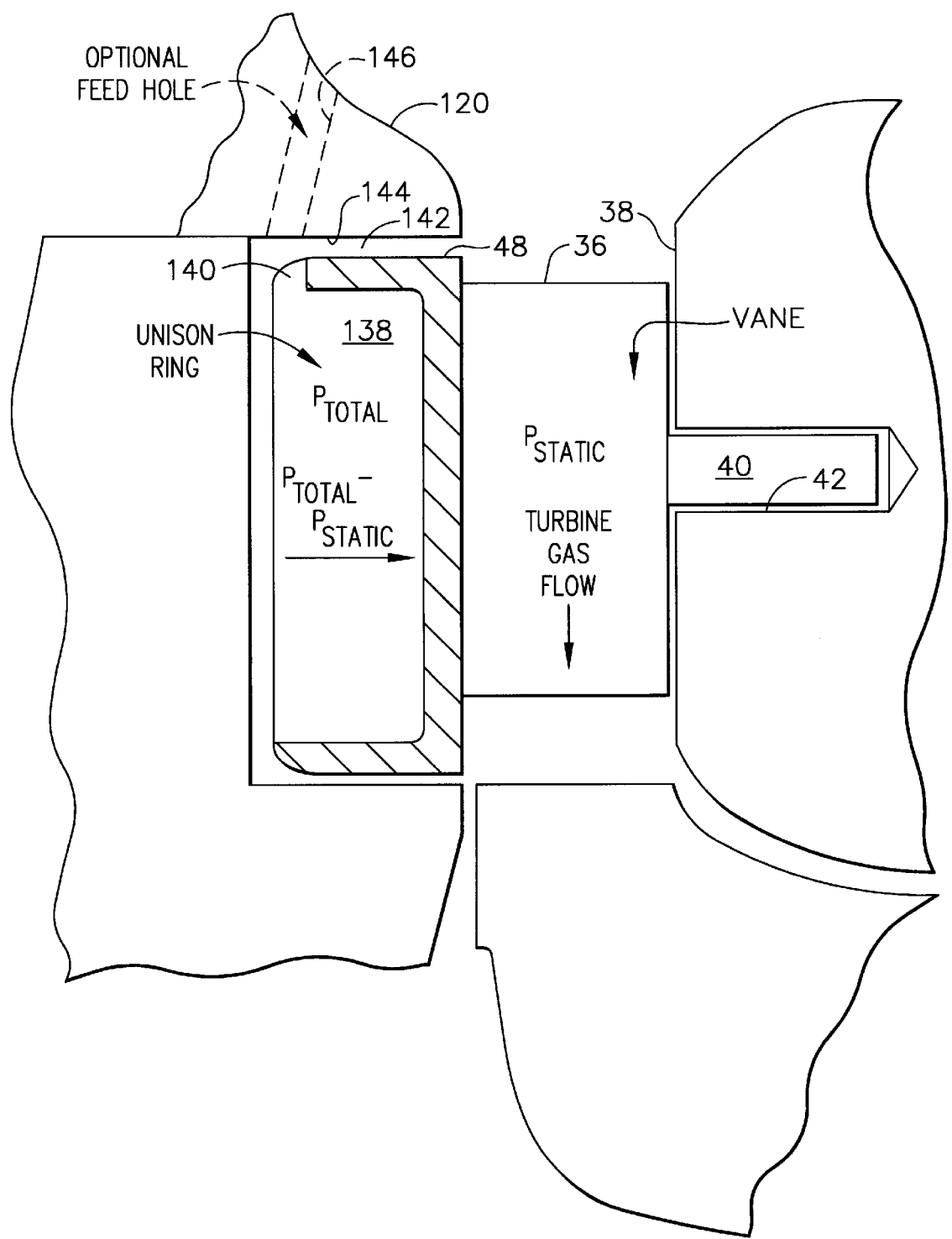
FIG. 8 is a schematic side view of the unison ring of FIG. 7 and vanes as mounted in the turbine housing to demonstrate the pressure compensation for vane tolerance control.

In certain applications, pressure balancing of the mounting of the vanes in the nozzle is desirable. FIG. 7 shows one embodiment of the unison ring 48 that incorporates blind slots 46 while providing a blind relief 138 on the reverse side of the ring with pressure ports 140 machined into the relief. FIG 8 is a detail side section of the relieved unison ring engagement the vanes in the nozzle. For the arrangement shown, pressure of the exhaust gas entering the nozzle pressurizes the relieved back portion 138 of the unison ring through gap 142 provided by tolerancing of the mounting channel 144 in the back plate 120, through ports 140. Alternatively, a feed hole 146 is provided through the back plate into the unison ring mounting channel proximate the location of the ports 144. Total pressure of the exhaust gas urges the unison ring against the vanes, which are in turn urged against the nozzle surface 38 in the turbine housing. Holes 42 receiving the vane pins 40 are provided with sufficient depth to allow the vanes to be maintained in close contact with the nozzle surface and unison ring for minimum vane leakage.

Actuation of the vanes is initiated by the solenoid valve 84 and actuation components previously described. FIGS. 9a through 9e show the various states of the actuation piston 86 and its piston rod 88 driving gear 62 through rack 90. The solenoid valve is reacted by a spring 150 having a cap 152 engaging a cam 154 machined into the gear body. Various ports, as will be described are then opened and closed, hydraulically positioning the piston which, through the mechanical closed loop of the rack and gear provides positive control an the position of the crank shaft and, therefore, the unison ring.

Figure 9A:
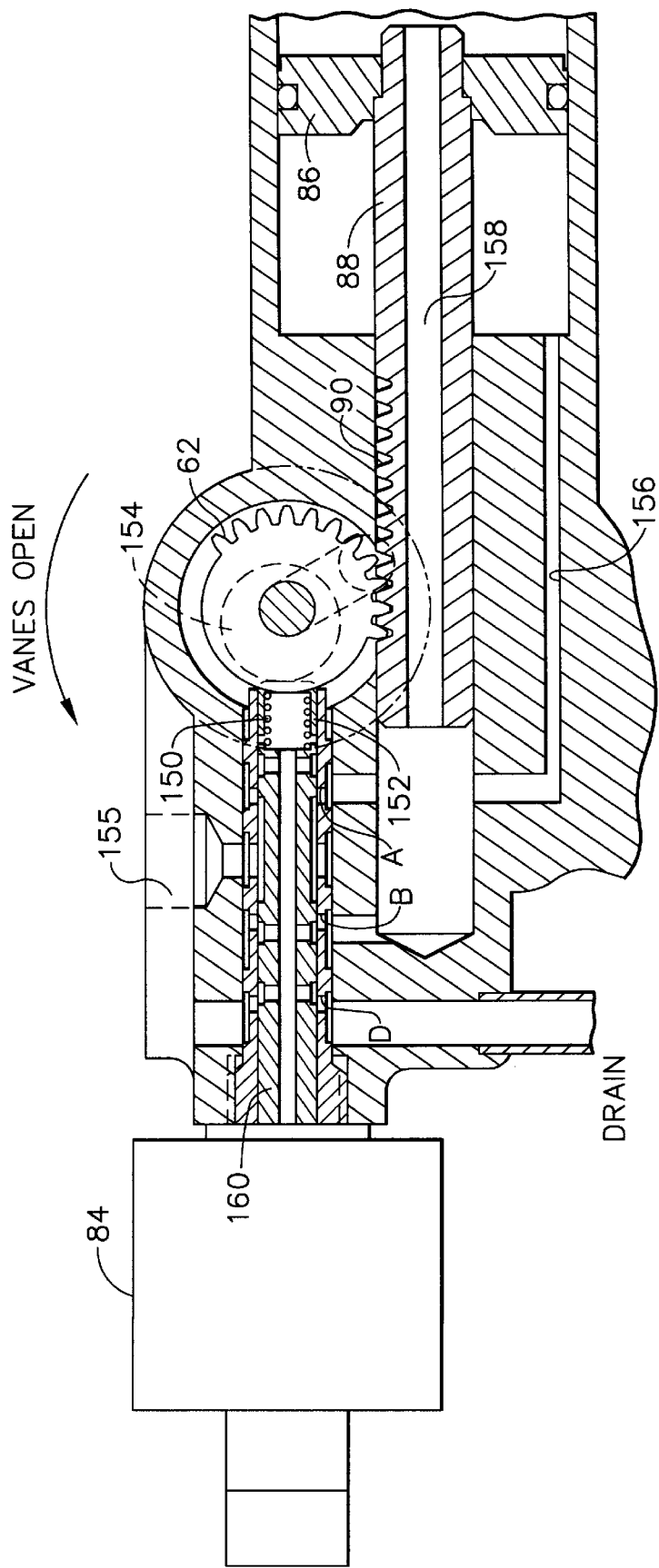
FIGS. 9a–e are schematic side views of the actuation valve porting and piston structure for control of the vane position.
Figure 9B:
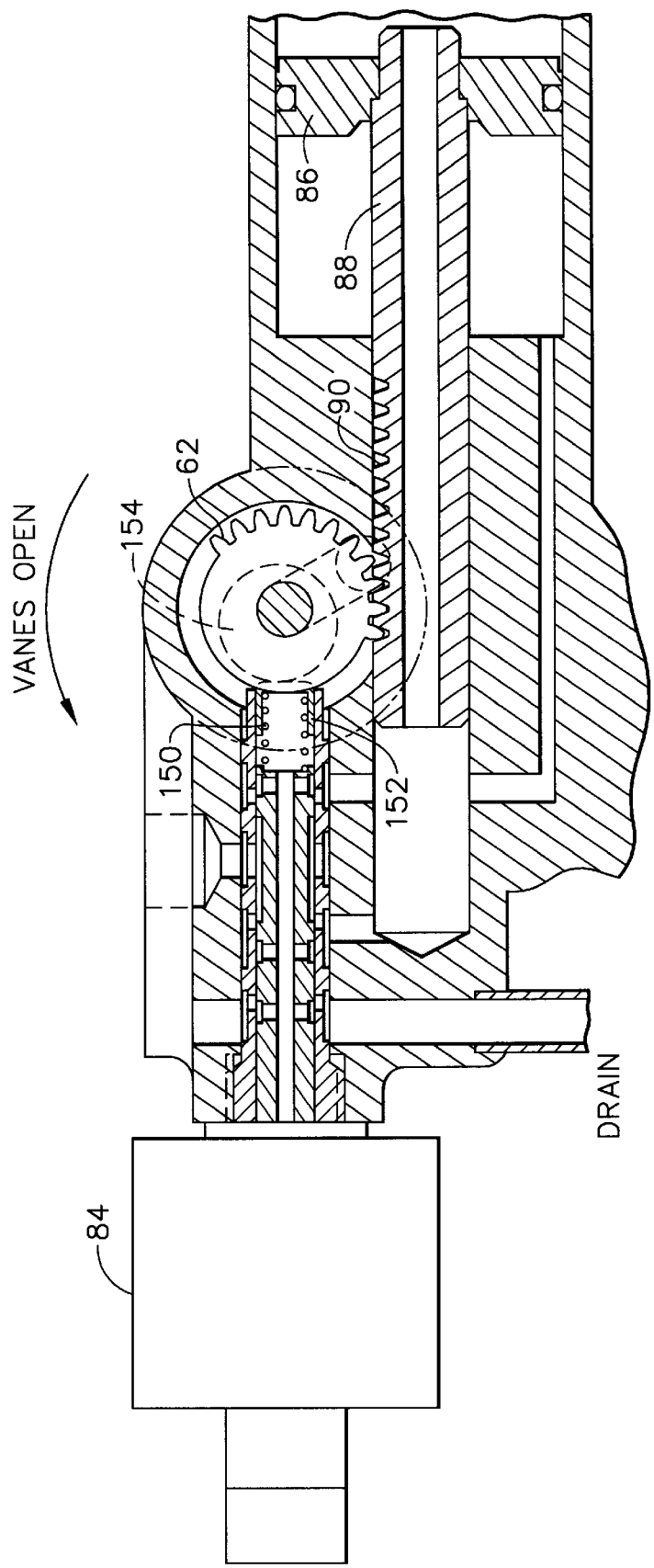

The solenoid valve is a proportional servo 4-way hydraulic actuator control valve. As shown in FIG. 9a, if no current is applied to the solenoid, the channeled stem 160 is positioned so port A is open, port B (top of the piston) is connected to drain port D. When oil pressure is applied from the engine on which the turbocharger is mounted, oil pressure is directed from the source 155 through port A into the bottom of the piston through conduit 156, placing the vanes in a fully open position. As shown in FIG. 9b when current is applied to the solenoid, port A is closed, port A (bottom of the piston) is connected to drain, port B opens and oil pressure is directed to the top of the piston through conduit 158, moving the piston to the left starting to close the vanes.

Figure 9C:
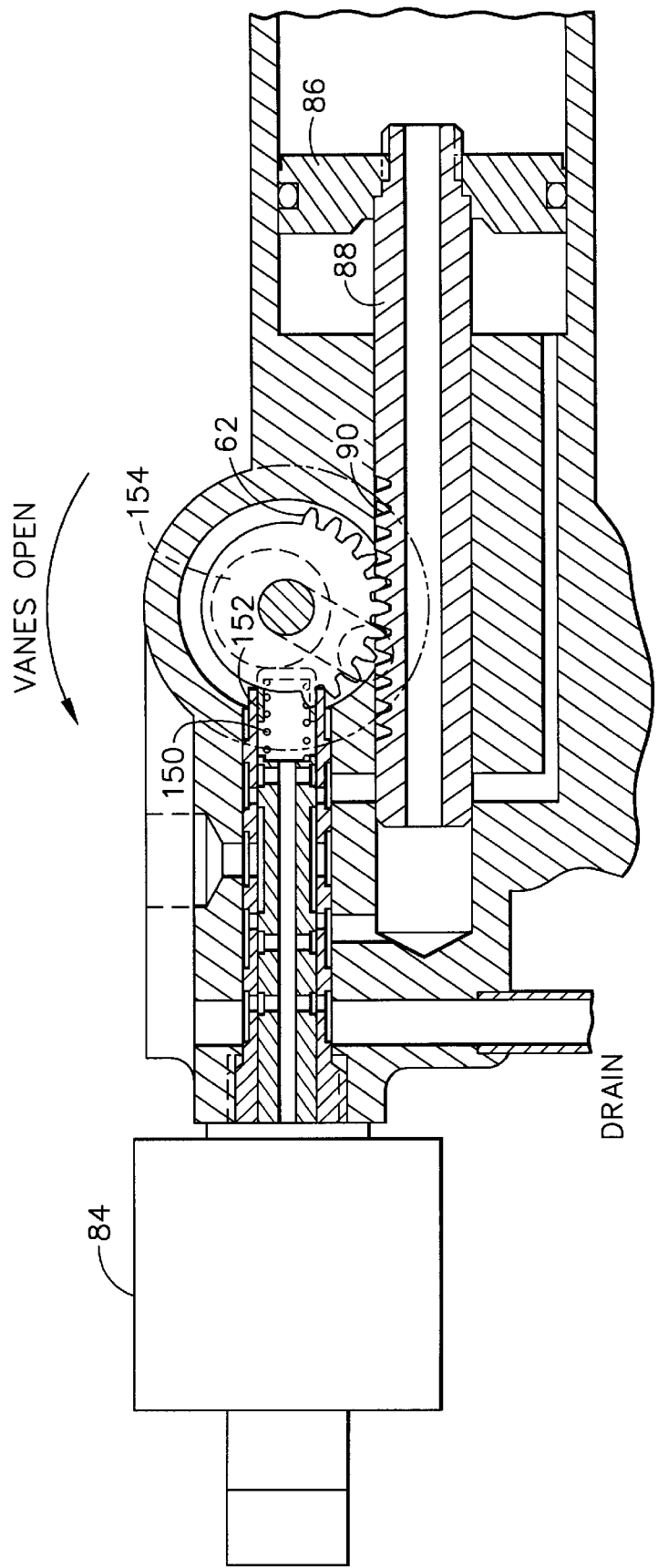
Figure 9D:
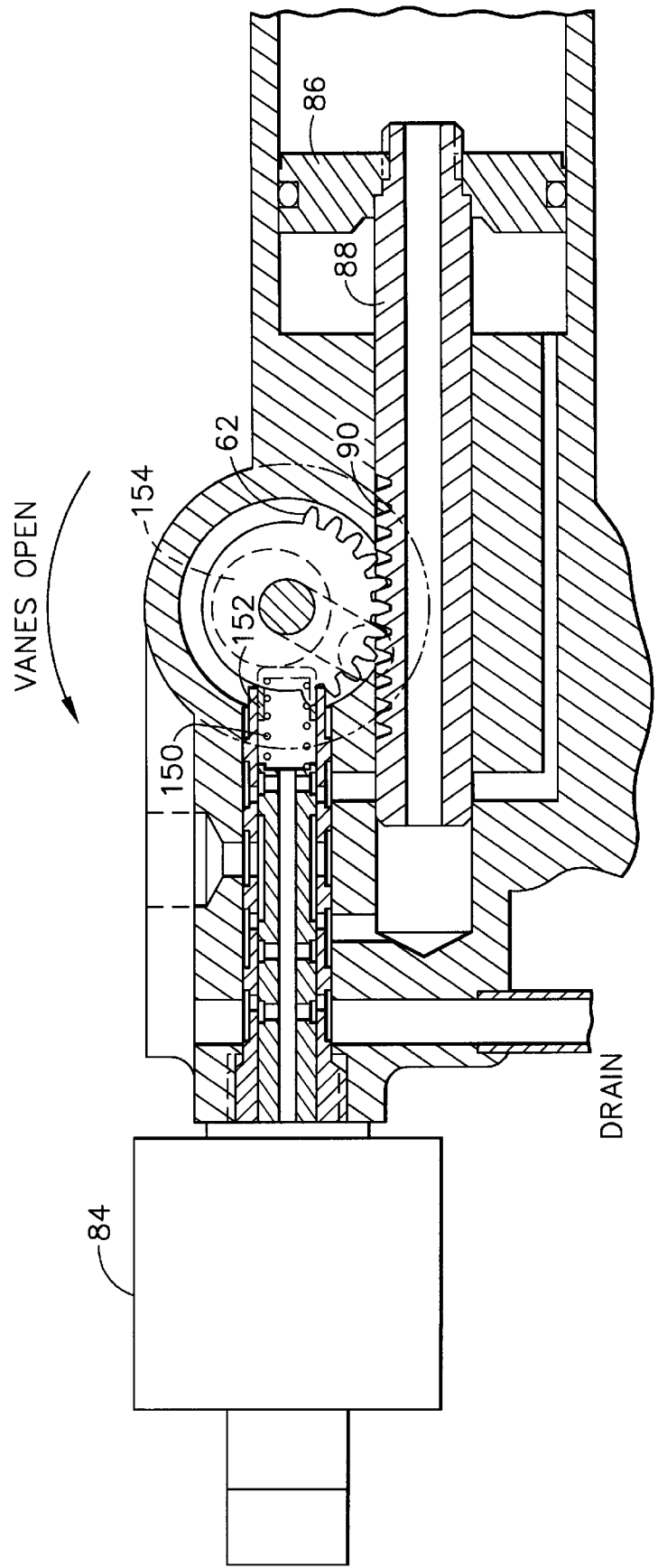
Figure 9E:
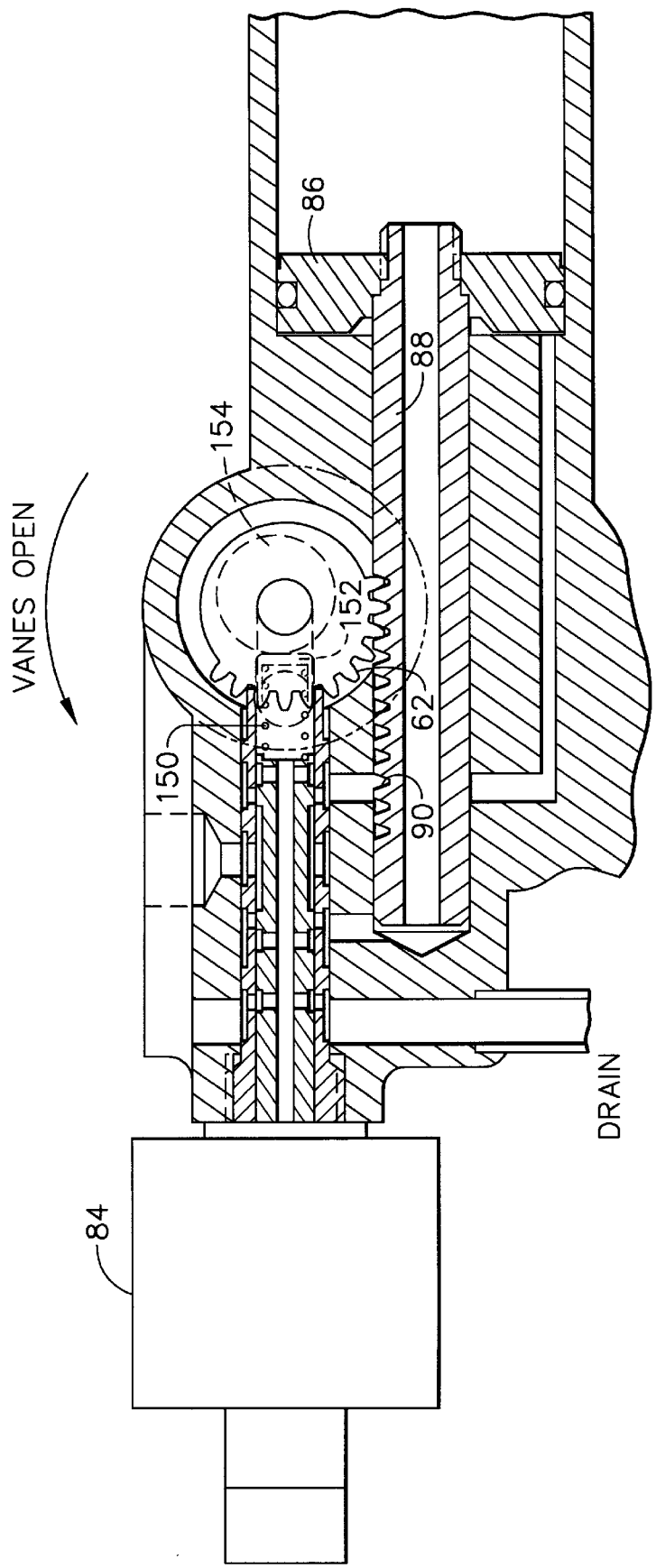

FIG 9c shows the condition of the actuation systems with a balanced state low current in the solenoid. Port A is closed, port B is closed and the vanes are positioned as a function of the applied current. If the current is increased, FIG. 9d shows that port B is opened directing oil pressure to the top of the piston. Port A is connected to the drain and the piston moves to the left, moving the vanes in the closed direction. After some finite time, the system stabilizes in a balanced state with high current as shown in FIG. 9e with port A closed, port B closed and the vanes positioned as a function of the applied current. Full current applied to the solenoid results in port B being closed, oil pressure being directed to the top of the piston while port A is connect to the drain and the piston moves to the left until a full closed vane position is achieved. Removing current from the solenoid returns the actuation system to the state shown in FIG. 9a with the vanes fully open.

Having now fully described the invention as required by the patent statutes, those skilled in the art will be able to ascertain modifications and alterations to the specific embodiments disclosed herein. Such modifications and alterations are within the scope of the invention as defined in the following claims.

What is claimed is:

1. A variable geometry turbocharger comprising:
   a turbine housing having an inlet for exhaust gas and an outlet, a volute connected to the inlet and an integral outer nozzle wall adjacent the volute;
   a center housing attached to the turbine housing and having a center bore carrying a bearing assembly;
   a compressor housing having an air inlet and a compressed air outlet the compressor housing attached to the center housing;
   a turbine wheel carried within the turbine housing and attached to a shaft extending through the center housing, supported by the bearing assembly, the shaft attached distal the turbine wheel to a compressor impeller carried within the compressor housing;
   a plurality of vanes having rotation posts extending form a first surface substantially parallel to the outer nozzle wall, the posts received in circumferentially spaced apertures in the outer nozzle wall, the vanes further having actuation tabs extending from a second surface of the vanes distal the first surface;
   a unison ring intermediate the center housing and the vanes, the unison ring having a plurality of slots equal in number to the vanes, said slots oriented obliquely to a circumference of the incision ring and receiving the tabs, the unison ring further having a radial slot;
   a crank shaft having a pin engaging the radial slot, the crank shaft movable continuously from a first position to a second position, movement of the crank shaft causing the pin to translate in the radial slot and impart force perpendicular to the radial slot to urge rotational motion of the unison ring, the rotational motion of the unison ring causing the tabs to traverse the actuation slots from a first end of the slots to the second end of the slots; and
   means for moving the crank shaft from the first position to the second position.

2. The variable geometry turbocharger as defined in claim 1 wherein the tabs incorporate substantially flat sides to be received within the actuation slots.

3. The variable geometry turbocharger as defined in claim 2 wherein the actuation slots incorporate a profile predetermined to provide maximum engagement of a first side of each tab with the tab located at the first end and second end of the slots and maximum engagement of a second side of each tab with the tab located in the slot intermediate the first and second end.

4. The variable geometry turbocharger as defined in claim 1 wherein the moving means comprises a hydraulic actuator integral with the center housing and having
   a piston received in a boss integrally cast in the center housing for reciprocating motion perpendicular to the crank shaft;
   a piston rod attached to the piston at a first end;
   means for attaching the piston rod to the crank shaft, the attaching means converting reciprocating motion of the rod to rotational motion of the shaft; and
   means for controllably varying hydraulic pressure on opposing sides of the piston to induce motion from a first position corresponding to the first position of the crank shaft to a second position corresponding to the second position of the crank shaft.

5. The variable geometry turbocharger as defined in claim 4 wherein the attaching means comprises:

a gear rack on the piston rod; and a pinion gear on the crank shaft.

6. The variable geometry turbocharger as defined in claim 4 wherein the means for controllably varying the hydraulic pressure comprises:

a channeled hydraulic valve stem movable by an variable current electric solenoid balanced by a bias spring;

a hydraulic pressure source in communication with a first port with the stem in a first position and a second port with the stem in a second position;

a hydraulic drain in communication with second port with the stem in a first position and first port with the stem in the second position;

a first conduit communicating with a second side of the piston and communicating with the first port;

a second conduit communicating with a second side of the piston and communicating the second port; and a cam on the crank shaft operatively engaging the bias spring.

7. The variable geometry turbocharger as defined in claim 1 wherein the actuation slots are blind and further comprising:

an annular channel in the center housing closely receiving the unison ring; and means for supplying air pressure to the channel to urge the unison ring into close contact with the second surface of the vanes.

* * * * *

UNITED STATES PATENT AND TRADEMARK OFFICE
CERTIFICATE OF CORRECTION

PATENT NO. : 6,269,642 B1  Page 1 of 1
APPLICATION NO. : 09/408694
DATED : August 7, 2001
INVENTOR(S) : Steven Don Arnold et al.

It is certified that error appears in the above-identified patent and that said Letters Patent is hereby corrected as shown below:

On Title Page
Abstract Item (57) - Line 5: replace "the" with --and-- after "opening"
Column 1, Line 57: add the word --is-- after "shaft"
Column 4, Line 23: replace "exceed" with --exceeding--
Column 5, Line 1: replace "engagement" with --engaging--
Column 5, Line 24: replace "an" with --on--
Column 6, Line 9: add --,-- (comma) after the word "outlet"
Column 6, Line 25: replace "incision" with --unison--
Column 7, Line 6: replace "an" with --a--
Column 7, Line 11: add the word --the-- after "communication with"
Column 8, Line 2: add the word --with-- after "communicating"

Signed and Sealed this

Sixteenth Day of October, 2007

JON W. DUDAS
*Director of the United States Patent and Trademark Office*